(12) United States Patent  
Piramoon

(10) Patent No.: US 8,323,169 B2  
(45) Date of Patent: Dec. 4, 2012

(54) FIXED ANGLE CENTRIFUGE ROTOR WITH TUBULAR CAVITIES AND RELATED METHODS

(75) Inventor: Sina Piramoon, San Jose, CA (US)

(73) Assignee: Fiberlite Centrifuge, LLC, Santa Clara, CA (US)

( * ) Notice: Subject to any disclaimer, the term of this patent is extended or adjusted under 35 U.S.C. 154(b) by 660 days.

(21) Appl. No.: 12/616,276

(22) Filed: Nov. 11, 2009

(65) Prior Publication Data

US 2011/0111942 A1    May 12, 2011

(51) Int. Cl.
*B04B 5/02* (2006.01)
*B65H 81/00* (2006.01)

(52) U.S. Cl. ............ 494/16; 494/81; 156/172; 156/185

(58) Field of Classification Search .............. 494/17–21, 494/31, 33, 43, 81; 74/572.11–572.12; 156/160–192, 195, 272.2; 242/433
See application file for complete search history.

(56) References Cited

U.S. PATENT DOCUMENTS

| | | | | |
|---|---|---|---|---|
| 3,248,046 A | * | 4/1966 | Feltman, Jr. et al. | ............ 494/16 |
| 4,449,965 A | * | 5/1984 | Strain | .............................. 494/16 |
| 4,484,906 A | * | 11/1984 | Strain | .............................. 494/16 |
| 4,675,001 A | * | 6/1987 | Johanson | ......................... 494/85 |
| 4,701,157 A | * | 10/1987 | Potter | .............................. 494/16 |
| 4,738,656 A | | 4/1988 | Piramoon et al. | |
| 4,781,669 A | | 11/1988 | Piramoon | |
| 4,790,808 A | | 12/1988 | Piramoon | |
| 4,817,453 A | * | 4/1989 | Breslich et al. | ............... 74/572.4 |
| 4,824,429 A | * | 4/1989 | Keunen et al. | ................... 494/16 |
| 4,860,610 A | * | 8/1989 | Popper et al. | ................. 74/572.4 |
| 4,944,721 A | * | 7/1990 | Carson | ............................ 494/16 |
| 4,991,462 A | * | 2/1991 | Breslich et al. | ............... 74/572.4 |
| 5,057,071 A | | 10/1991 | Piramoon | |
| 5,206,988 A | | 5/1993 | Piramoon | |
| 5,232,432 A | * | 8/1993 | Eberle | ............................. 494/16 |
| 5,362,300 A | * | 11/1994 | Christensen | .................... 494/16 |
| 5,362,301 A | | 11/1994 | Malekmadani et al. | |

(Continued)

FOREIGN PATENT DOCUMENTS

GB        2098516 A   * 11/1982

(Continued)

OTHER PUBLICATIONS

European Patent Office, International Search Report and Written Opinion of the International Searching Authority, International Application No. PCT/US2010/056171, mailed Feb. 16, 2011 (10 pages).

*Primary Examiner* — Charles E Cooley
(74) *Attorney, Agent, or Firm* — Wood, Herron & Evans, LLP

(57) ABSTRACT

A fixed angle centrifuge rotor is provided. The rotor includes a rotor body having a circumferential sidewall and a plurality of tubular cavities. Each of the cavities has an open end and a closed end and is configured to receive a sample container therein. A pressure plate is operatively coupled to the plurality of tubular cavities so that the pressure plate, in combination with the plurality of tubular cavities, defines an enclosed hollow chamber between each adjacent pair of the plurality of tubular cavities. Each of the plurality of tubular cavities has a sidewall facing an interior of the rotor body and a bottom wall at the closed end.

18 Claims, 12 Drawing Sheets

U.S. PATENT DOCUMENTS

| | | | | |
|---|---|---|---|---|
| 5,382,219 | A | 1/1995 | Malekmadani | |
| 5,411,465 | A | 5/1995 | Glen et al. | |
| 5,505,684 | A | 4/1996 | Piramoon | |
| 5,533,644 | A | 7/1996 | Glen et al. | |
| 5,540,126 | A | 7/1996 | Piramoon | |
| 5,545,118 | A * | 8/1996 | Romanauskas | 494/20 |
| 5,558,616 | A * | 9/1996 | Barkus et al. | 494/12 |
| 5,562,582 | A | 10/1996 | Malekmadani | |
| 5,562,584 | A * | 10/1996 | Romanauskas | 494/20 |
| 5,601,522 | A | 2/1997 | Piramoon | |
| 5,643,168 | A | 7/1997 | Piramoon et al. | |
| 5,683,341 | A | 11/1997 | Giebeler | |
| 5,759,592 | A | 6/1998 | Piramoon et al. | |
| 5,776,400 | A | 7/1998 | Piramoon et al. | |
| 5,833,908 | A | 11/1998 | Piramoon et al. | |
| 5,876,322 | A | 3/1999 | Piramoon | |
| 5,972,264 | A | 10/1999 | Malekmadani et al. | |
| 6,056,910 | A | 5/2000 | Fritsch et al. | |
| 6,296,798 | B1 | 10/2001 | Piramoon | |
| 6,482,342 | B1 | 11/2002 | Malekmadani et al. | |
| 8,147,392 | B2 * | 4/2012 | Piramoon et al. | 494/16 |
| 8,273,202 | B2 * | 9/2012 | Piramoon et al. | 156/172 |
| 2010/0216622 | A1 * | 8/2010 | Piramoon et al. | 494/21 |
| 2010/0331163 | A1 * | 12/2010 | Kitazawa et al. | 494/20 |
| 2011/0111942 | A1 * | 5/2011 | Piramoon | 494/16 |
| 2012/0186731 | A1 * | 7/2012 | Piramoon et al. | 156/172 |

FOREIGN PATENT DOCUMENTS

| | | | |
|---|---|---|---|
| JP | 56111063 A | * | 9/1981 |
| JP | 60090057 A | * | 5/1985 |
| JP | 60118259 A | * | 6/1985 |
| JP | 61101262 A | * | 5/1986 |
| JP | 01135550 A | * | 5/1989 |

* cited by examiner

FIXED ANGLE CENTRIFUGE ROTOR WITH TUBULAR CAVITIES AND RELATED METHODS

TECHNICAL FIELD

This invention relates generally to centrifuge rotors and, more particularly, to a fixed-angle rotor for use with a centrifuge.

BACKGROUND

Centrifuge rotors are typically used in laboratory centrifuges to hold samples during centrifugation. While centrifuge rotors may vary significantly in construction and in size, one common rotor structure is the fixed angle rotor having a solid rotor body with a plurality of cell hole cavities distributed radially within the rotor body and arranged symmetrically about an axis of rotation. Samples are placed in the cavities, allowing a plurality of samples to be subjected to centrifugation.

Conventional fixed angle centrifuge rotors may be made from metal or various other materials. However, a known improvement is to construct a centrifuge rotor by a compression molding and filament winding process wherein the rotor is fabricated from a suitable material such as composite carbon fiber. For example, a fixed angle centrifuge rotor may be compression molded from layers of resin-coated carbon fiber laminate material. Examples of composite centrifuge rotors are described in U.S. Pat. Nos. 4,738,656, 4,781,669, 4,790,808, 5,505,684, 5,601,522, 5,643,168, 5,759,592, 5,776,400, 5,833,908, 5,876,322, 6,056,910, and 6,296,798, and (owned by the assignee of the present disclosure), and the respective disclosures of which are expressly incorporated herein by reference in their entirety.

Because centrifuge rotors are commonly used in high rotation applications where the speed of the centrifuges may exceed hundreds or even thousands of rotations per minute, the centrifuge rotors must be able to withstand the stresses and strains experienced during the high speed rotation of the loaded rotor. During centrifugation, a rotor with samples loaded into the cavities experiences high forces along directions radially outwardly from the cavities and in directions along the longitudinal axes of the cavities, consistent with the centrifugal forces exerted on the sample containers. These forces cause significant stress and strain on the rotor body.

A centrifuge rotor should be able to withstand the forces associated with rapid centrifugation over the life of the rotor. A known approach to make centrifuge rotors that withstand such forces and related stresses includes making the rotor body a solid structure, with the cavities defined by bores or suitably sized depressions in the rotor that are configured to receive the samples therein. Rotors of this type, however, are relatively difficult and expensive to manufacture, and their rotational speeds may be limited due to the relatively high mass of the rotors. A need therefore exists for centrifuge rotors that provide improved performance in consideration of the dynamic loads experienced during centrifugation, and which address these and other problems associated with conventional rotors.

SUMMARY

The present invention overcomes the foregoing and other shortcomings and drawbacks of centrifuge rotors heretofore known for use for centrifugation. While the invention will be discussed in connection with certain embodiments, it will be understood that the invention is not limited to these embodiments. On the contrary, the invention includes all alternatives, modifications, and equivalents as may be included within the spirit and scope of the invention.

In one embodiment, a fixed angle centrifuge rotor is provided. The rotor includes a rotor body having a circumferential sidewall shell and a plurality of tubular cell hole cavities. Each of the cavities has an open end and a closed end and is configured to receive a sample container therein. A pressure plate is operatively coupled to the plurality of tubular cavities so that the pressure plate, in combination with the plurality of tubular cavities, defines an enclosed hollow chamber between each adjacent pair of the plurality of tubular cavities. Each of the plurality of tubular cavities has a sidewall facing an interior of the rotor body and a bottom wall at the closed end.

In one embodiment, the pressure plate has a generally conical upstanding wall portion and a bottom wall portion extending outwardly from the generally conical upstanding wall portion. The generally conical upstanding wall portion of the pressure plate may be operatively coupled to each of the sidewalls of the plurality of tubular cavities and the bottom wall portion of the pressure plate may be operatively coupled to a substantial portion of each of the bottom walls of the plurality of tubular cavities. The bottom wall portion of the pressure plate may include a plurality of circumferentially spaced depressions each configured to operatively couple with a respective one of the bottom walls of the plurality of tubular cavities.

The rotor may include an elongated reinforcement extending around the circumferential sidewall of the rotor body. The elongated reinforcement may additionally extend at least partially around an exterior surface of the pressure plate. In one embodiment, the elongated reinforcement includes a single carbon fiber tow. Alternatively, the reinforcement may comprise multiple fiber tows or unidirectional tape in other embodiments. Additionally or alternatively, at least one of the rotor body or the pressure plate may be made of carbon fiber. The rotor body and the pressure plate may be a compression-molded unitary structure.

In yet another embodiment, a method is provided for forming a centrifuge rotor. The centrifuge rotor has a rotor body including a circumferential sidewall and a plurality of tubular cavities, with each cavity having an open end and a closed end. Each of the cavities is configured to receive therein a sample container. The method includes operatively coupling a pressure plate to the closed end of each of the tubular cavities to thereby define an enclosed hollow chamber between each adjacent pair of tubular cavities. Additionally or alternatively, the method may include compression-molding the rotor body and the pressure plate as a unitary structure.

The method may include the step of applying a reinforcement around an exterior of the rotor body and at least partially around an exterior surface of the pressure plate. Applying the reinforcement may include continuously winding a high strength fiber such as a single carbon fiber tow around the exterior of the rotor body. Alternatively, the reinforcement may comprise multiple fiber tows or unidirectional tape in other embodiments. The carbon fiber tow, for example, may be coated with resin, and the method may then include curing the carbon fiber tow to make it integral with the rotor body. The method may, additionally or alternatively, include helically winding the single carbon fiber tow around the exterior of the rotor body. The method may, additionally or alternatively, include helically winding two or more high strength fibers such as carbon fiber tows around the exterior of the rotor body.

The method may also include the steps of obtaining a top plate having a plurality of holes, inserting the plurality of tubular cavities through the holes, and compression-molding the top plate and the tubular cavities to define a unitary structure. The method may include surrounding a substantial portion of each of sidewalls of the tubular cavities with the hollow chambers. Additionally or alternatively, the method may include engaging a substantial portion of each of bottom walls of the cavities with the pressure plate.

The above and other objects and advantages of the present invention shall be made apparent from the accompanying drawings and the description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

Figure 1:
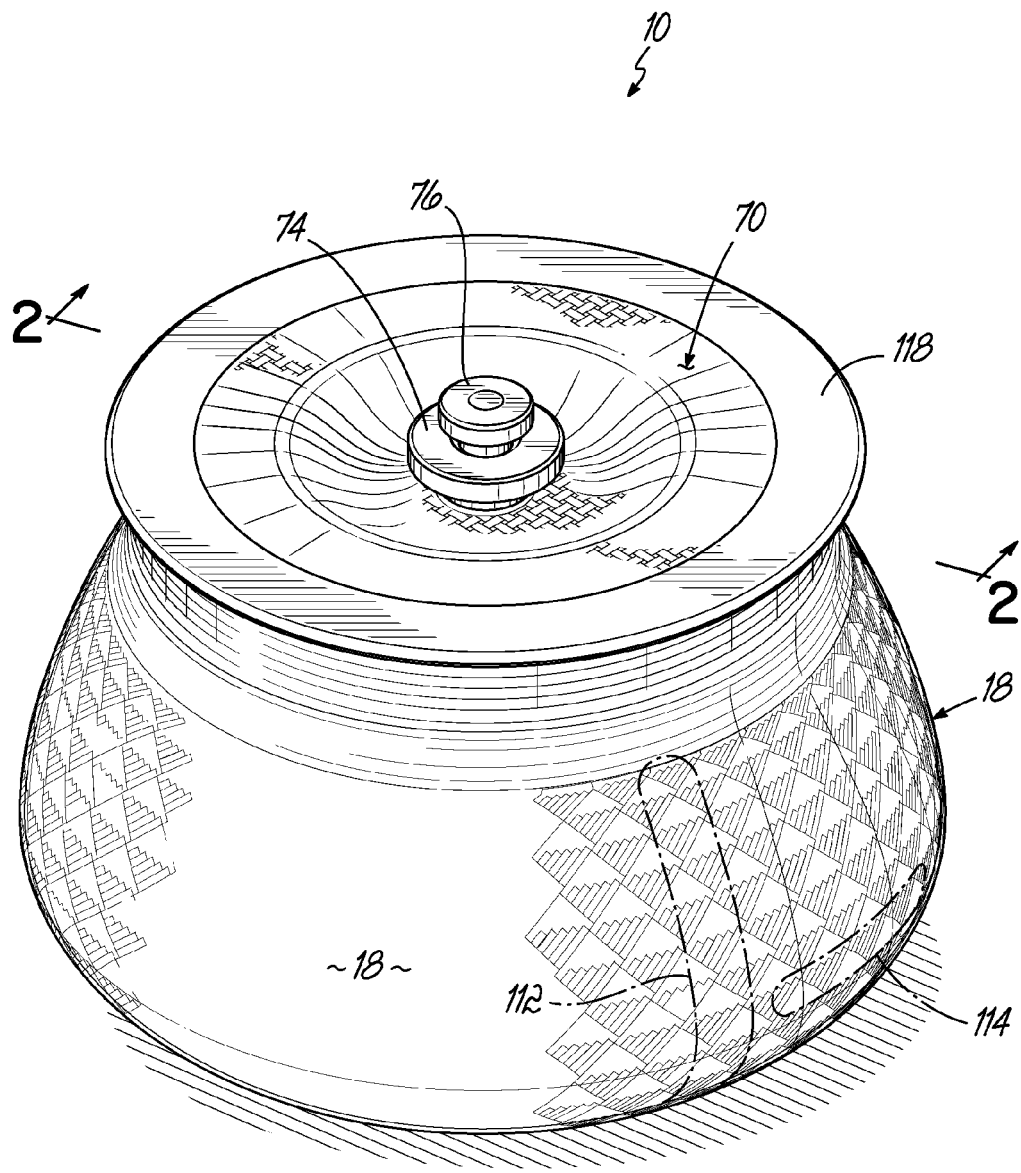
FIG. 1 is a perspective view of a centrifuge rotor in accordance with one embodiment of the present invention.
Figure 2:
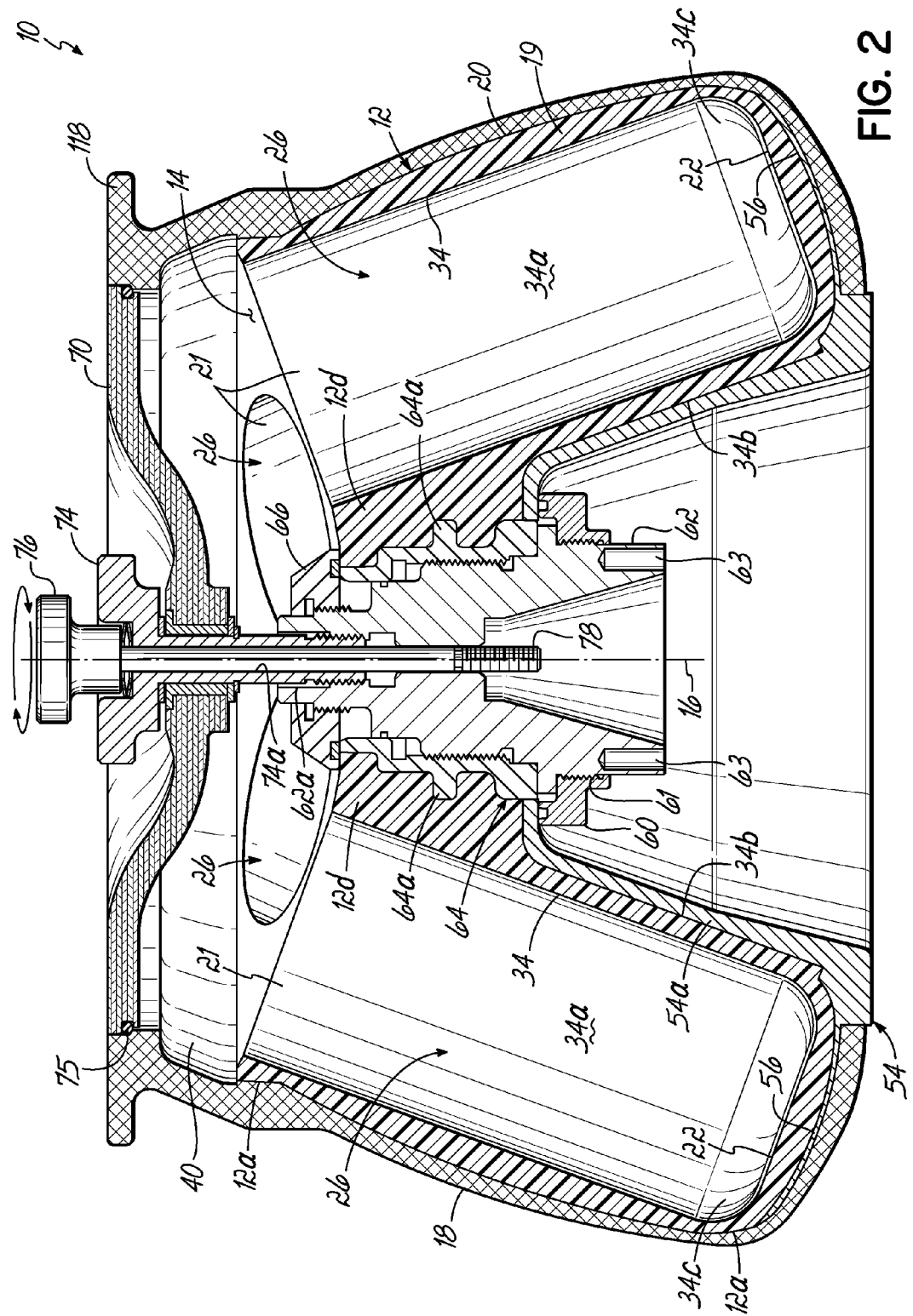
FIG. 2 is a cross-sectional view taken generally along line 2-2 of FIG. 1.
Figure 3:
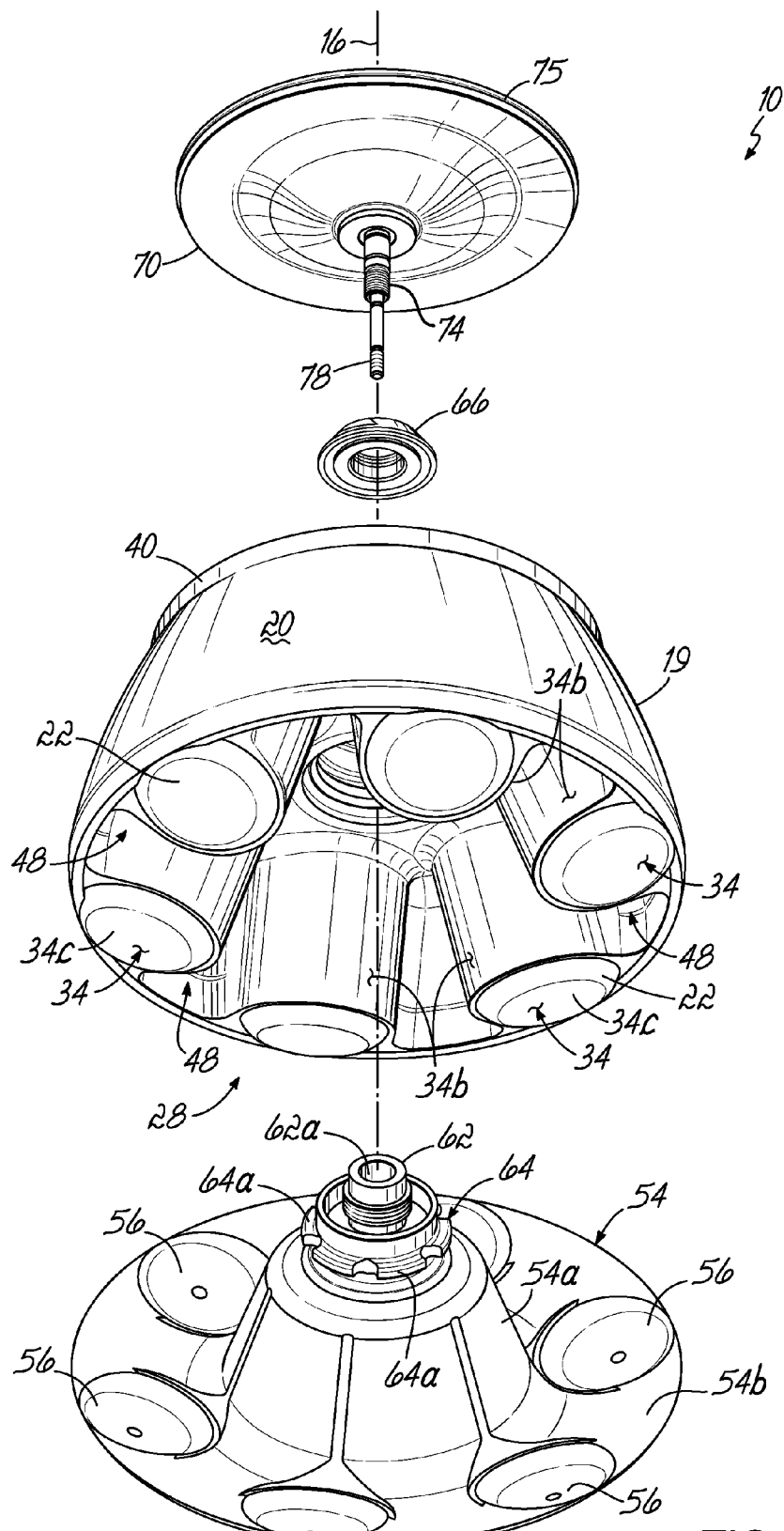
FIG. 3 is a partially disassembled, perspective view of the centrifuge rotor of FIGS. 1-2.

FIGS. 1-3 illustrate an exemplary centrifuge rotor 10 in accordance with one embodiment of the present invention. The rotor 10 includes a rotor body 12 having an upper surface 14 and being symmetrical about an axis of rotation 16 of the rotor body 12, about which samples (not shown) are centrifugally rotated. An elongated reinforcement 18 extends continuously around a generally smooth, exterior surface 20 of a circumferentially-extending sidewall 19 (FIG. 3) of the rotor body 12. As used herein, the term "generally smooth" to describe the exterior surface 20 is intended to describe a surface 20 that does not have a stepped configuration, and is generally free of corners or sharp edges. In this regard, the above-defined term is not intended to define the surface roughness of the surface 20. Moreover, the rotor body 12 may be formed such that the generally smooth exterior surface 20 requires no additional machining or finishing prior to the application of the reinforcement 18.

The rotor 10 includes a plurality (e.g., 4 or 6) of tubular cell hole cavities 26 extending from the upper surface 14 and toward an interior 28 (FIGS. 2A and 3) of the rotor body 12. As used herein, the term "interior" when referring to the interior 28 of rotor 10, refers to that portion of the rotor 10 that is enclosed by the outer walls defining the overall shape of rotor 10. Each tubular cavity has an open end 21 at the upper surface 14 and an opposite closed end 22. Each of the cavities 26 is suitably sized and shaped to receive therein one of the sample containers (not shown) for centrifugal rotation of these about axis 16. Each of the cavities 26 is defined by a sidewall 34 having a suitably chosen thickness and cross-sectional profile. Each sidewall 34 has a first face 34a defining a container-receiving, first face of the cavities 26, and an opposed second face 34b facing the interior 28 of the rotor body 12. As used herein, the term "tubular" refers to cavities having any cross-sectional shape, including for example and not limited to rounded shapes (e.g., oval, circular or conical), quadrilateral shapes, regular polygonal or irregular polygonal shapes, or any other suitable shape. Accordingly, this term is not intended to be limited to the generally circular cross-sectional profile of the exemplary tubular cavities 26 illustrated in the figures.

Figure 2A:
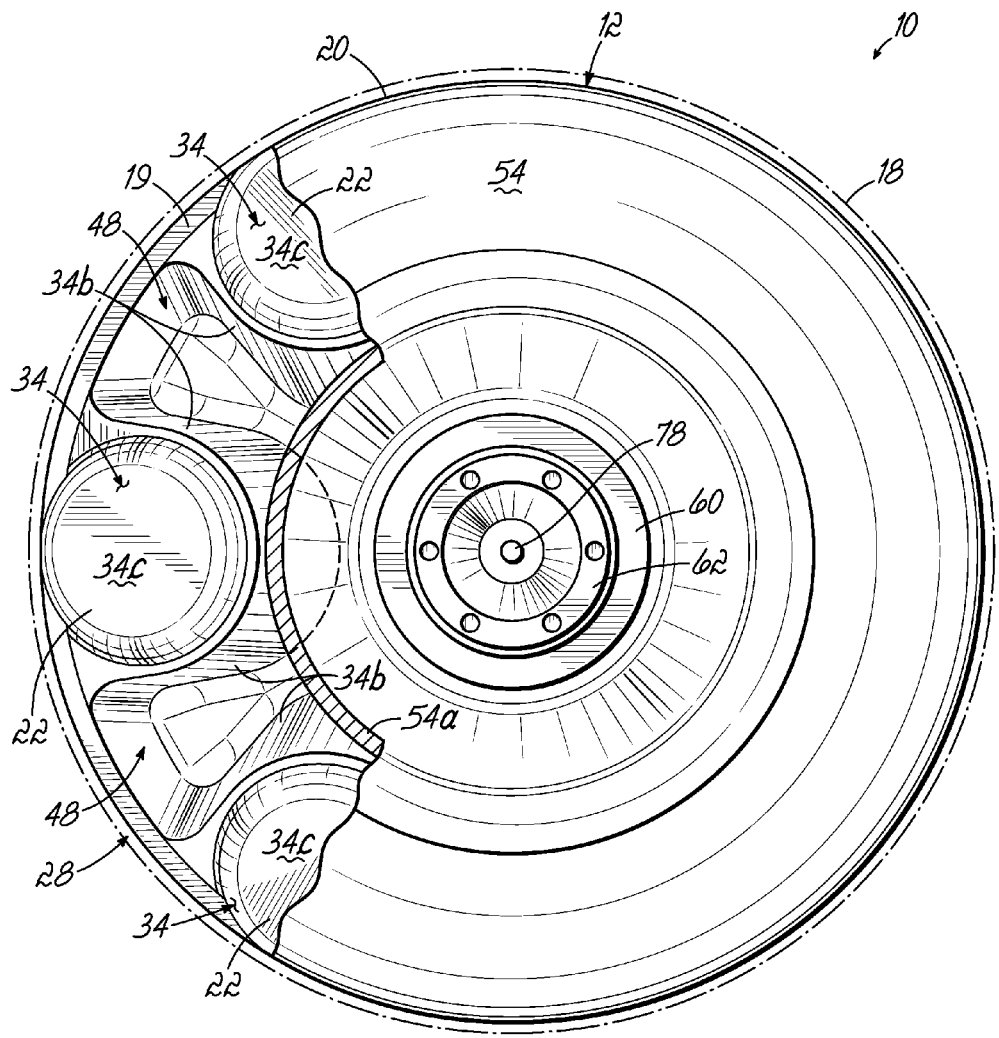
FIG. 2A is a partially broken away view of a bottom of the rotor of FIGS. 1-2.
Figure 3A:
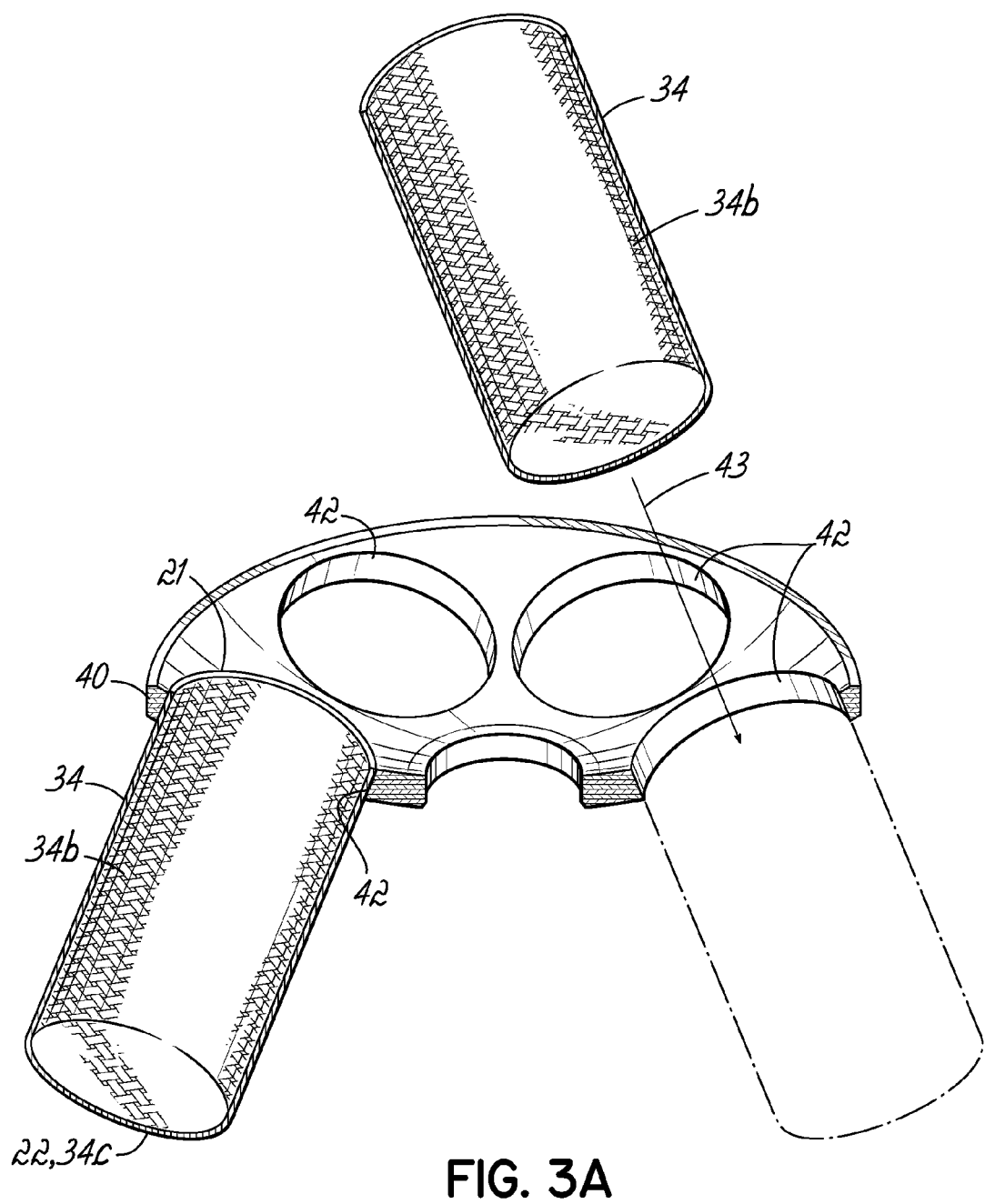
FIG. 3A is a schematic representation of an exemplary method for forming a first portion of the rotor of FIGS. 1-3.

With continued reference to FIGS. 1-3 and further referring to FIG. 3A, making of the rotor 10 of this embodiment may include forming the tubular cavities 26 along with portions of the rotor body 12 defining the upper surface 14. More specifically, and with particular reference to FIG. 3A, a top plate 40 may be obtained having a plurality of holes 42 corresponding to each of the cavities 26. Each of the tubular cavities 26 is then inserted (in the direction of arrow 43) through one of the holes 42 and pressure and heat are then applied to the tubular cavities 26 and to the top plate 40 to thereby form a unitary structure. The tubular cavities 26 and the top plate 40 are made of suitably chosen materials. For example, and without limitation, the tubular cavities 26 and top plate 40 may made of a light, yet strong material such as carbon fiber, which facilitates minimizing the overall mass of the rotor 10. In the illustrated embodiment, moreover, the tubular cavities 26 are formed such that respective portions of each of the second faces 34b are surrounded by a pair of adjacent hollow chambers 48 (FIGS. 2A and 3) within the interior 28 of rotor body 12, which further facilitates minimizing the overall mass of the rotor 10. It is contemplated, however, that alternative embodiments may be such that the tubular cavities 26 are partially, additionally surrounded, in the interior 28, by a light material that does not add significant mass to the rotor 10.

The hollow chambers 48 are further defined by coupling of a pressure plate 54 of rotor 10 to the rotor body 12, as explained in further detail below. More specifically, when the pressure plate 54 and rotor body 12 are coupled to one another, a centrally located, generally conical upstanding wall portion 54a of pressure plate 54 engages (e.g., abuts against) a radially inward-facing side portion of each of the second faces 34b of tubular cavities 26, thereby defining the plurality of enclosed hollow chambers 48, as best illustrated in FIGS. 2A and 3. In this regard, the hollow chambers 48, along with the generally conical upstanding wall portion 54a and the upward-facing portions of a bottom wall portion 54b of pressure plate 54, further define the interior 28 of rotor 10.

Moreover, in the illustrated embodiment, all of the tubular cavities 26 are formed such that the second faces 34b of each pair of adjacent tubular cavities 26 face a common, enclosed hollow chamber 48. It is contemplated that, alternatively to the embodiment illustrated in the figures, a rotor may have cavities 26 each exposed to more than two hollow chambers 48. Each of the enclosed hollow chambers 48 in the embodiment of FIGS. 2-2A is further defined by the circumferential sidewall 19 of the rotor body 12. In this regard, therefore, operative coupling between the pressure plate 54 and the sidewalls 34 of cavities 26 defines a plurality of enclosed hollow chambers 48 bordered by the sidewall 19, respective side portions of the second faces 34b of two adjacent tubular cavities 26, and the central wall portion 54a of pressure plate 54. It is contemplated, however, that such definition of the hollow chambers 48 is merely exemplary and thus not intended to be limiting. Also, in the illustrated embodiment, a substantial portion of each of the second faces 34b is surrounded by hollow space (i.e., corresponding to a pair of adjacent ones of the enclosed hollow chambers 48). As used herein, the term "substantial" when used to describe the portion of a second face 34b of a tubular cavity 26 that is surrounded by a hollow chamber 48 is intended to describe an embodiment where at least about 40%, and preferably between about 40% and about 60%, of a particular second face 34b is surrounded by hollow space.

With particular reference to FIGS. 2 and 3, the rotor 10 includes, as discussed above, a pressure plate 54 that defines the bottom of rotor 10 and which is operatively coupled to the tubular cavities 26. Notably, the pressure plate 54 is operatively coupled to the closed ends 22 of cavities 26 to support the tubular cavities 26 during high-speed rotation of rotor 10, thereby providing structural integrity and minimizing the likelihood of failure of rotor 10. In use, when the rotor 10 is spun, the pressure plate 54 applies torque to the tubular cavities 26 and the rotor body 12. More specifically, the bottom wall portion 54b of the pressure plate 54 includes a plurality of circumferentially-spaced depressions or cavities 56, each configured to receive and engage, in abutting relationship, a respective one of bottom walls 34c at the closed ends 22 of the tubular cavities 26 during high-speed rotation of the rotor 10. To this end, coupling between the pressure plate 54 and the rotor body 12 may be such that the pressure plate 54 exerts pressure against each of the bottom walls 34c, thereby providing the required support. The depressions 56 are suitably shaped so as to contact a substantial portion of each of the bottom walls 34c. This facilitates minimizing the possibility of concentrating stresses associated with high-speed rotation on the pressure plate 54. In this particular embodiment, for example, each of the depressions 56 has a generally flat surface corresponding to the also generally-flat shape of the bottom walls 34c of cavities 26. Moreover, in the illustrated embodiment, when the pressure plate 54 is engaged with the rotor body 12, abutting-engagement of the conically-shaped central portion 54a of pressure plate 54 with the tubular cavities 26 further provides support to the tubular cavities 26 during high-speed rotation of rotor 10.

Coupling between pressure plate 54 and rotor body 12, in this embodiment, is facilitated by a fastener, such as a retaining nut 60, for example, and further by compression-molding of the pressure plate 54 and tubular cavities 26 with one another to thereby yield a unitary structure. More specifically, and with particular reference to FIGS. 2 and 2A, the retaining nut 60 threadably engages an externally threaded portion 61 of a rotor hub 62 which, as discussed below, facilitates engagement of the rotor 10 by a centrifuge spindle (not shown) to enable high-speed rotation of the rotor 10. Engagement of the nut 60 is effected from an underside of pressure plate 54, with such engagement thereby securing the rotor hub 62 and the central portion 54a of pressure plate 54 relative to one another, as illustrated in the figures. The rotor hub 62, in turn, is threadably secured to a rotor insert 64 that is located in the interior 28 of rotor body 12 and engaged with a central interior portion 12d of rotor body 12.

Those of ordinary skill in the art will readily appreciate that the illustrated coupling between the pressure plate 54 and rotor body 12 is exemplary rather than intended to be limiting, insofar as variations in the type of coupling between these components are also contemplated. Such coupling may further be facilitated by the reinforcement 18, which may, for example, be applied by winding (e.g., helically winding) a continuous strand of high strength fiber such as a single tow or strand of carbon fiber (e.g. a resin-coated carbon fiber) around the exterior surface 20 of rotor body 12 and over exposed portions of the pressure plate 54. Especially when the fiber is resin coated, after compression-molding (i.e., wherein heat and pressure are applied), the pressure plate 54 and rotor body 12 become a unitary structure. In a specific embodiment, making of the rotor 10 may include curing a resin-coated carbon fiber tow or strand of reinforcement 18 such that the strand becomes integral with the rotor body 12 and/or the pressure plate 54. In one aspect, the pressure plate 54 is made of a suitably chosen material. For example, and without limitation, the pressure plate 54 may be made of carbon fiber, to further minimize the overall mass of rotor 10.

Referring again to FIGS. 2 and 3, in use the rotor 10 is mounted to the rotor hub 62, which is, in turn, coupled to a centrifuge spindle (not shown) through two or more pins received within respective bosses 63 at the bottom of hub 62 and other structures to be described in detail further below. The rotor 10 includes, as discussed above, a rotor insert 64 that is threadably engaged to the rotor hub 62. The insert 64 includes a plurality of webs 64a that are received within cooperating depressions in central interior portion 12d of rotor body 12. Once the rotor 10 is seated on the rotor hub 62, a hub retainer 66 is fastened to the top of the hub 62 to further facilitate holding the rotor body 12, pressure plate 54, hub 62 and insert 64 in place relative to one another. A lid 70 of rotor 10 is coupled to the rotor body 12 through a lid screw 74 that is received through a threaded central opening 62a of hub 62. Moreover, in this embodiment, a seal element, such as an O-ring 75 (FIG. 2), for example, further facilitates coupling between lid 70 and rotor body 12. The lid 70 blocks access to the sample containers held in the cavities 26 during high speed rotation. Once the lid 70 is secured in place through engagement of the lid screw 74 with the central opening 62a, a tie-down screw 78 is inserted through a bore 74a of the lid screw 74. Rotation of the tie-down screw 78, in turn, permits threaded engagement of tie-down screw 78 with a cooperating threaded portion of the centrifuge spindle (not shown) which accordingly secures the rotor 10 to the centrifuge spindle. The centrifuge spindle may then be actuated to drive the rotor 10 into high-speed, centrifugal rotation. As those of ordinary skill in the art will appreciate, one or more of the rotor mounting components described above may be made of any suitable metallic or non-metallic material.

With reference to FIGS. 4A-4D, details of an exemplary apparatus and an exemplary method for applying the reinforcement 18 are provided. A guide 80 is used to apply a strand 18a to the outer surface 20 of the rotor body 12 along a generally helical reinforcement path 82. The path of the guide 80 relative to the rotor body 12 defines the path 82 of the strand 18a. The guide 80 may have multiple degrees of freedom in order to ensure that the guide 80 correctly guides the strand 18a onto the generally helical path 82 while staying substantially normal to the surface of the rotor body 12. In one embodiment, the reinforcement guide 80 may have five degrees of freedom, namely, the vertical and horizontal position of the guide 80, the pitch and yaw of the guide 80, and the radial position of the guide 80 relative to the axis of rotation 16. The strand 18a may be wound upon the rotor body 12 by rotating the body 12 about the axis 16 while manipulating the guide 80 to apply the strand 18a along the desired path 82.

The rotor body 12 may be held in a generally fixed position while being rotated about the axis 16, or the rotor body 12 may be moved relative to the guide 80 to define the desired path 82 for the strand 18a as it is wound onto the rotor body 12. Alternatively, the guide 80 may be held in a generally fixed position while the rotor body 12 is rotated about the axis 16 and moved relative to the guide 80 to apply the strand 18a along the desired path 82.

Figure 4A:
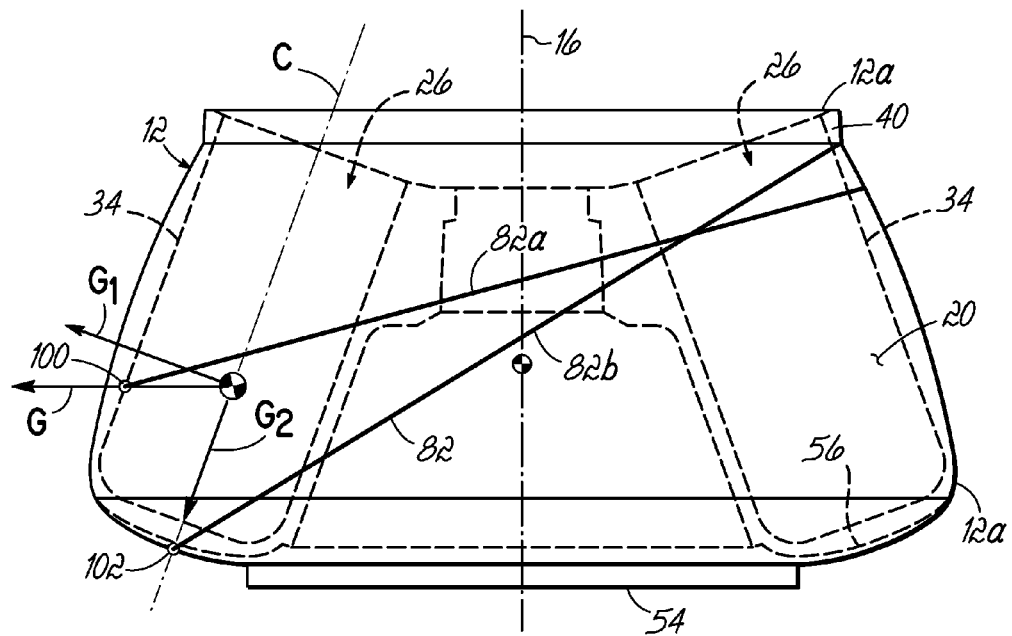
FIG. 4A is a schematic diagram of a rotor body of the centrifuge rotor of FIGS. 1-3.
Figure 5A:
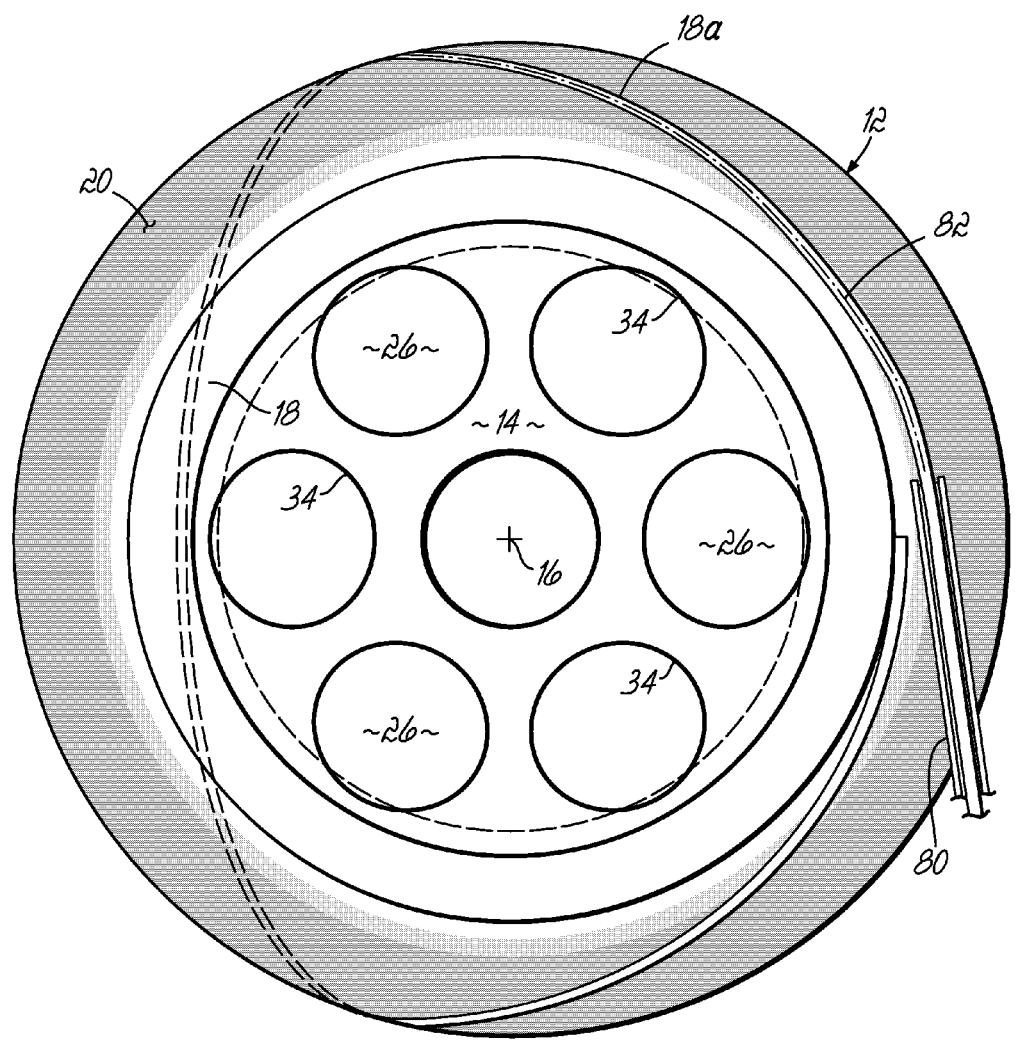
FIGS. 5A-5E are plan views of a rotor body with reinforcements wound thereon according to one embodiment of the present invention.
Figure 5B:
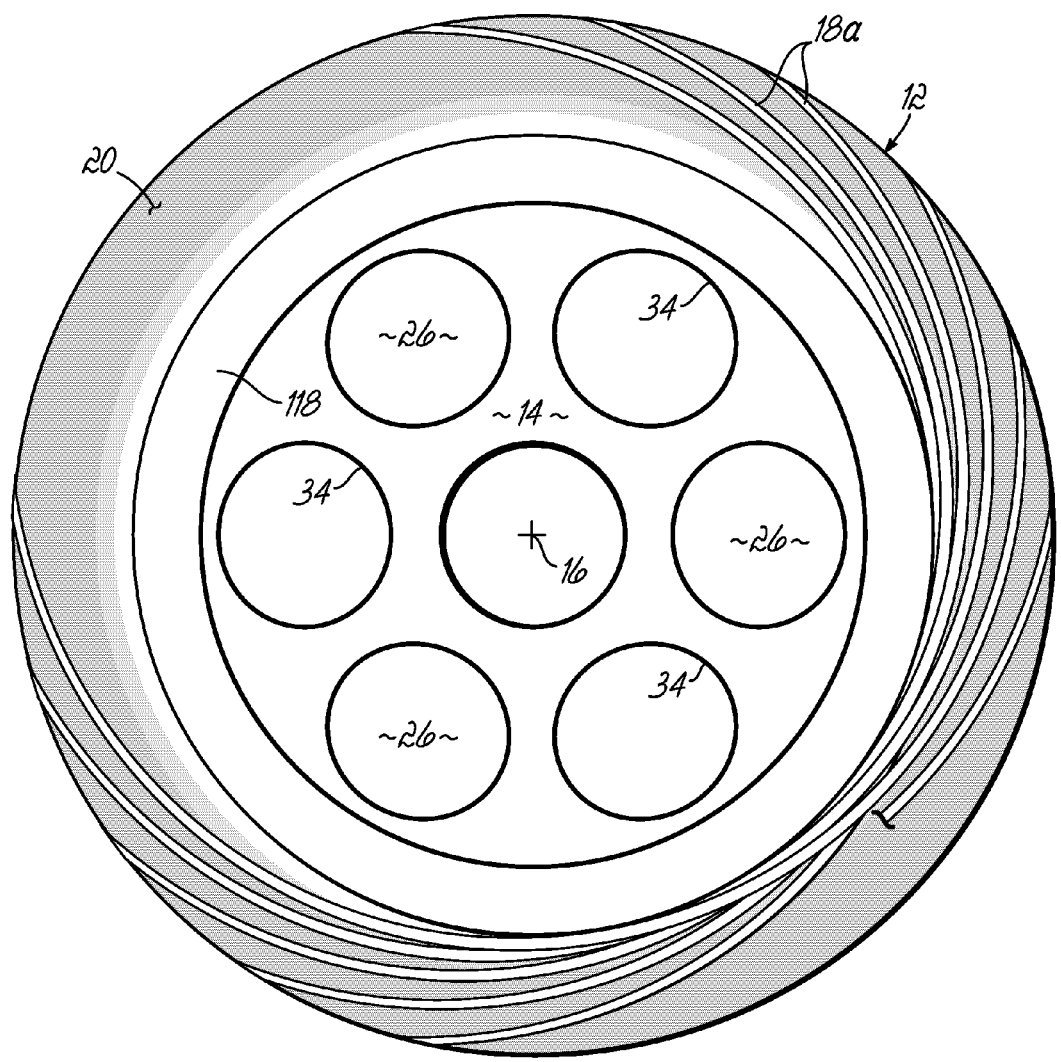
Figure 5C:
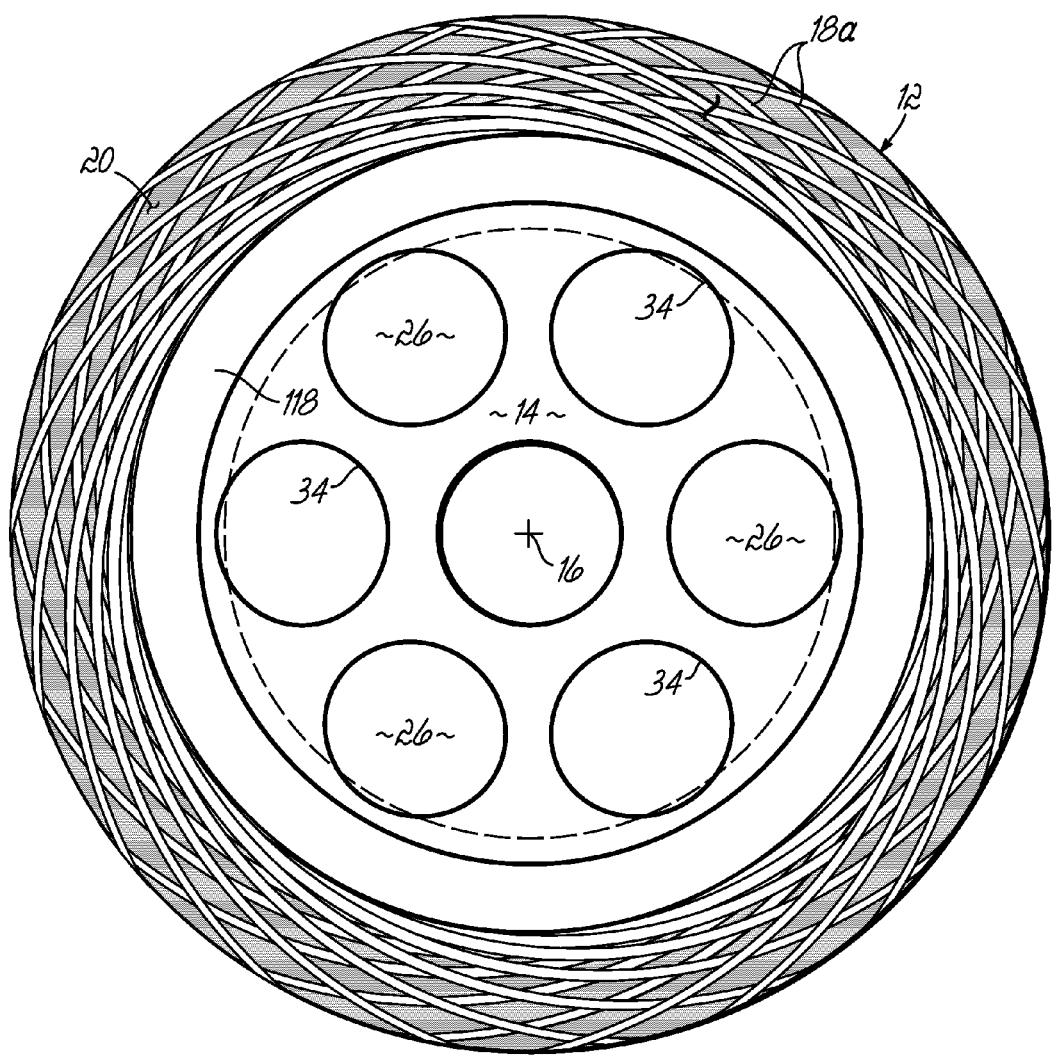
Figure 5D:
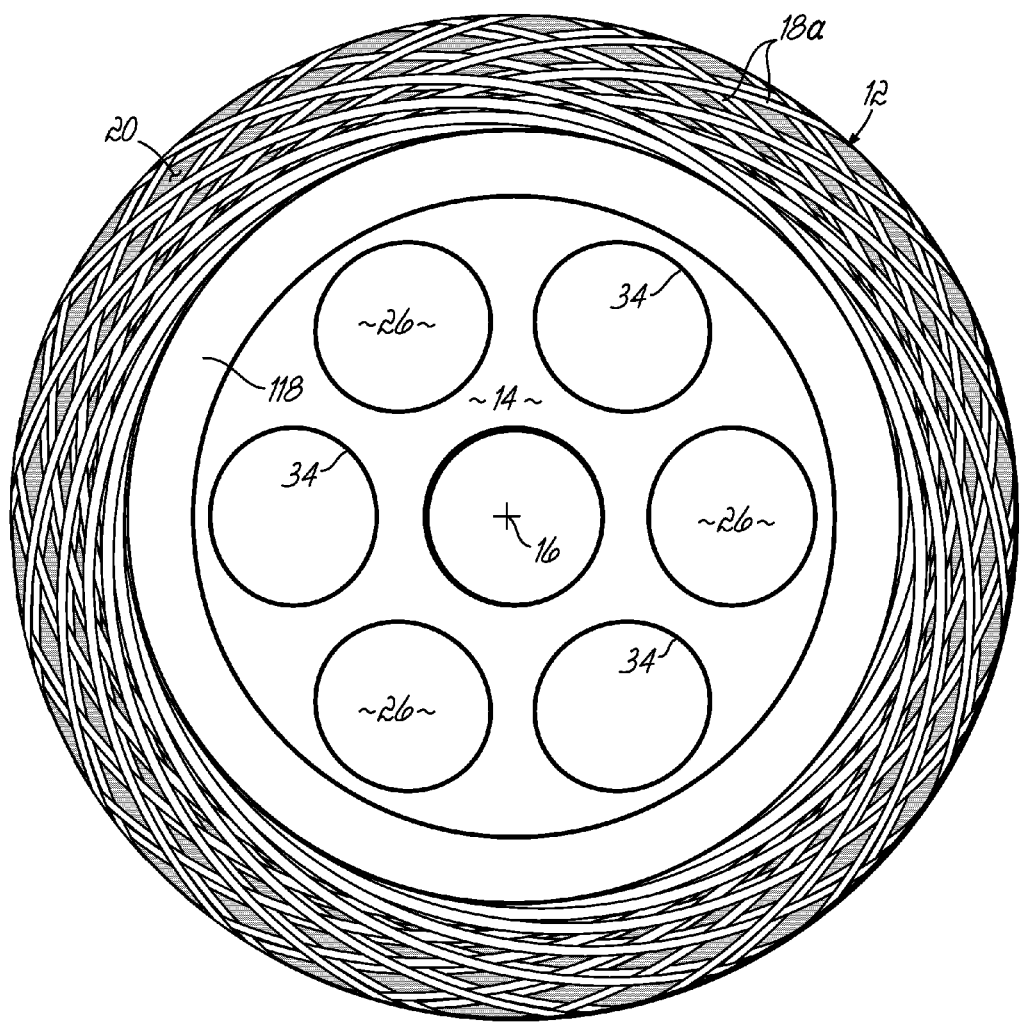
Figure 5E:
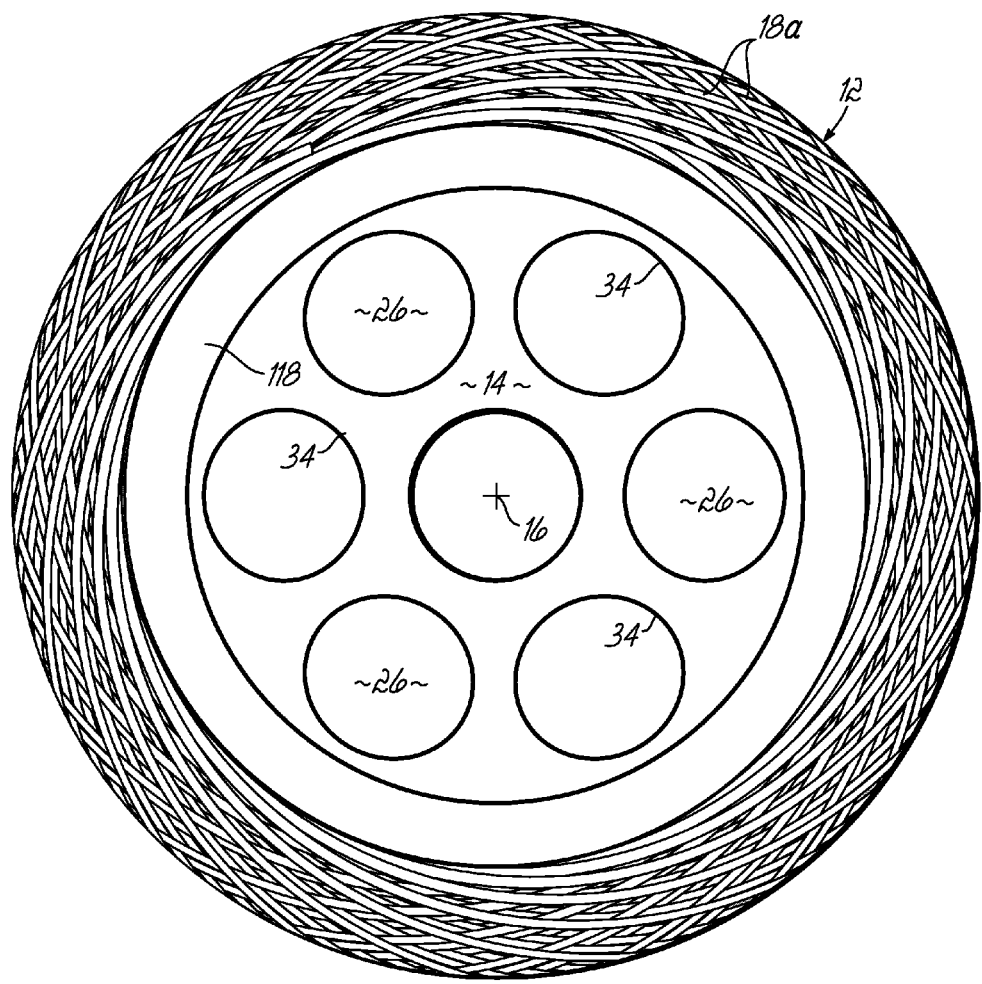

With particular reference to FIG. 4A, a schematic illustration of a side view of rotor body 12 is illustrated. Arrow G denotes the outward force exerted by the center of gravity of a loaded cavity 26 during centrifugation. Arrows G1 and G2 denote the components of that force normal to the exterior surface 20 of rotor body 12 and along central longitudinal axis C of the cavity 26, respectively. The schematic of FIG. 5A also depicts an exemplary helical reinforcement path 82. The helical reinforcement path 82 may include one or more of path components 82a and 82b. Path component 82a intersects a point 100 that is defined by the radical projection of the center of gravity G of a loaded cavity 26, intersecting with the exterior surface 20 of rotor body 12. Another path component 82b intersects a point 102 that is defined by the intersection of the longitudinal axis C of a cavity 26 with the exterior surface 20 at the lower end 12b of the rotor body 12. The guide 80 tightly winds the strand 18a around the smooth exterior surface 20 of rotor body 12. In one embodiment, sufficient tension is applied to the strand 18a by the guide 80 for the particular fiber path and rotor shape so that the normal forces exerted upon the strand 18a by the rotor body 12 substantially eliminate slipping of the strand 18a relative to the smooth exterior surface 20 of the rotor body 12.

Points 100 and 102 are shown on the exterior surface 20 of the substantially smooth rotor body 12. Point 100 corresponds to the radial projection, onto the exterior surface 20 of rotor body 12, of the location of the center of gravity of a loaded cavity. Point 102 corresponds to the intersection of a central longitudinal axis C of one of the cavities 26 with the outer surface of a lower end 12b of rotor body 12. In one embodiment, the reinforcement path 82 overlaps at one or both of these points 100, 102 such that at least two portions of strand 18a interlock to cover one or both points 100, 102. Each interlock may be formed, for example, by overlapping portions of strand 18a and applied resin. In this regard, vertical bands of interlocks 112 and horizontal bands of interlocks 114 (FIG. 1) may be formed by the layers of material defining reinforcement 18 around the rotor body 12. One or more of the vertical bands 112 may be located at the radial projection of one of the axes C on the surface 20 of the rotor body 12. In an exemplary method, one of the horizontal bands 114 may be disposed at the center of gravity of the loaded cavities 26 such that the reinforcement path 82 intersect selected points such as points 100 and 102, for example.

Figure 4B:
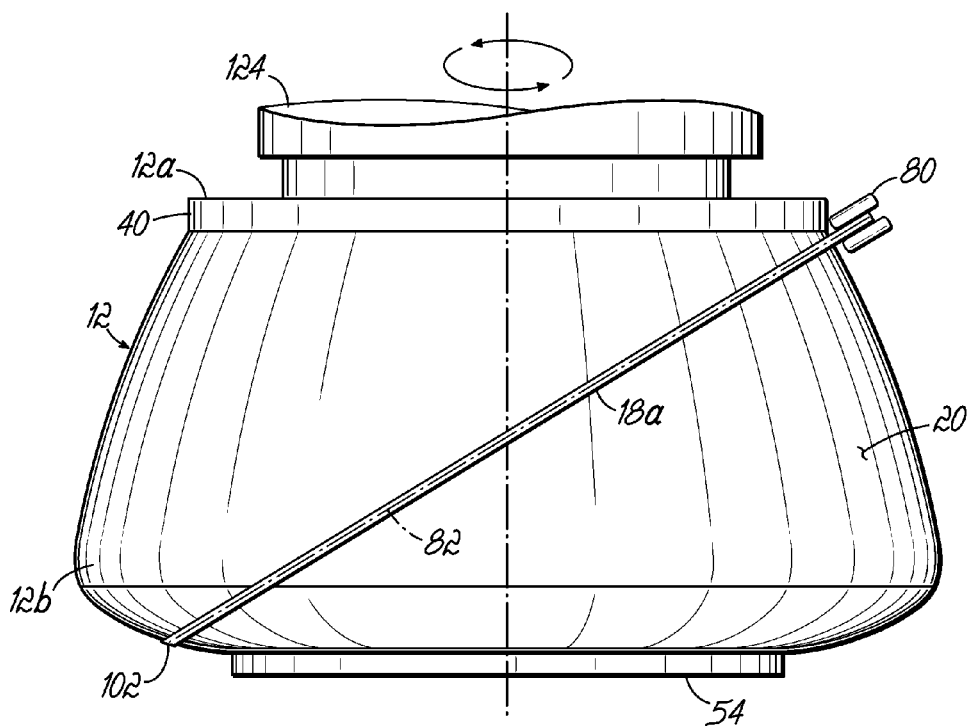
FIG. 4B is an elevation view of the rotor body of FIG. 4A with a reinforcement wound thereon according to one embodiment of the present invention.
Figure 4C:
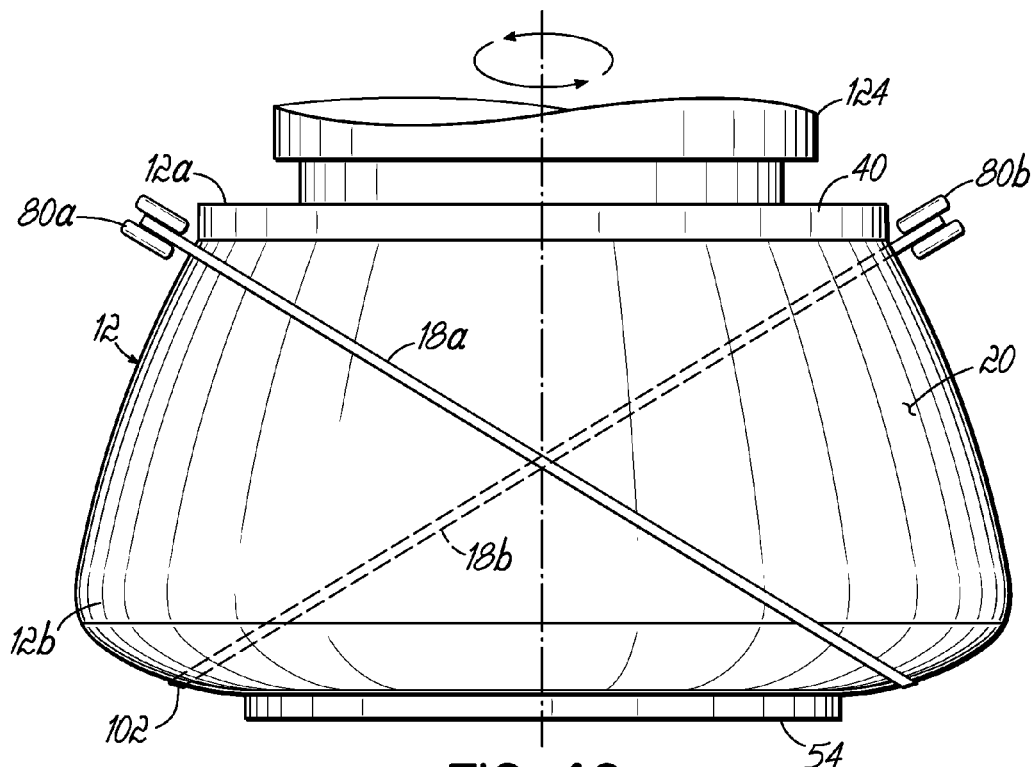
FIG. 4C is an elevation view of the rotor body of FIG. 4A with multiple reinforcements wound thereon according to one embodiment of the present invention.
Figure 4D:
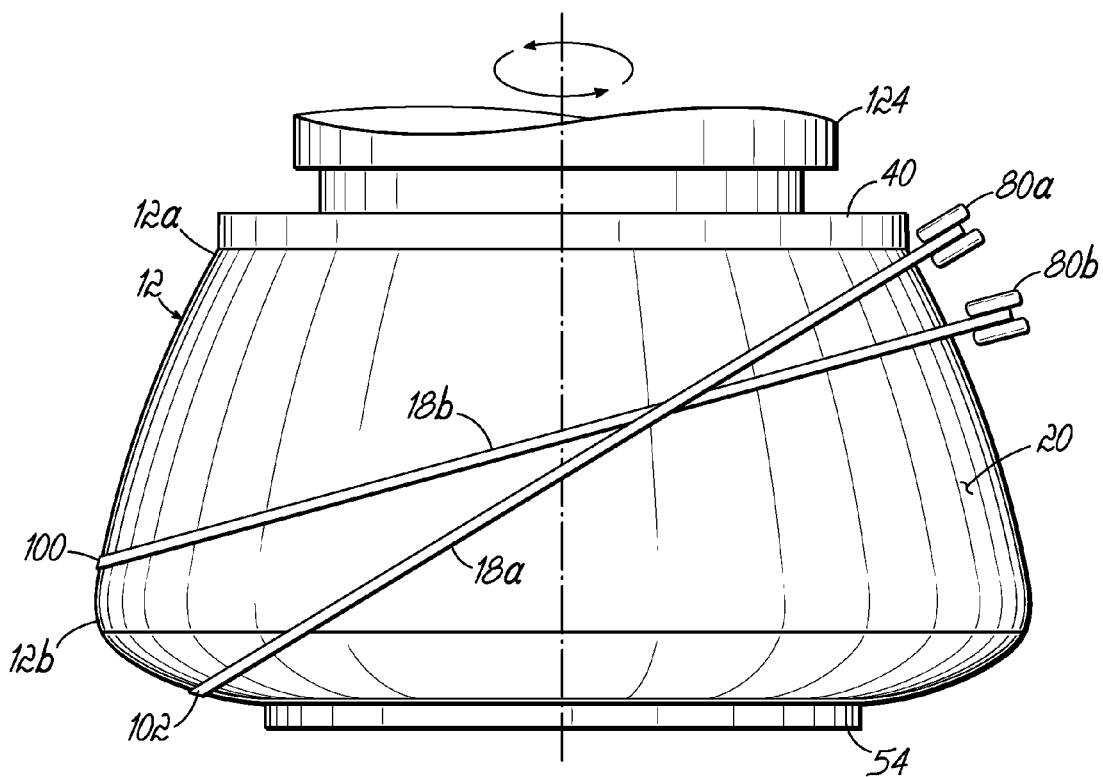
FIG. 4D is an elevation view of the rotor body of FIG. 4A with multiple reinforcements wound thereon according to another embodiment of the present invention.

Referring particularly to FIGS. 4C and 4D, a variation of the embodiment of FIGS. 4A-4B is illustrated. In this embodiment, two separate strands 18a, 18b are simultaneously applied to the exterior surface 20 of the rotor body 12 by respective guides 80a and 80b, so as to define the reinforcement 18. The starting points of the strands 18a, 18b may be positioned on opposite sides of the rotor body 12 to wind opposite one another, as depicted in FIG. 4C, or the starting points may be positioned proximate each other, as depicted in FIG. 4D. Each reinforcement guide 80a, 80b may have as many as five degrees of freedom, as discussed above. The reinforcement path 82 is generally helical and extends around the exterior surface 20 of the rotor body 12 while also moving axially between an upper end 12a and the lower end 12b of the body 12. The reinforcement path 82 may also extend at least partially around the bottom edge at the lower end 12b of the rotor body 12, and at least partially cover the pressure plate 54, for example. Point 102 is also shown in FIG. 4C, and points 100 and 102 are shown in FIG. 4D. Where multiple reinforcement strands 18a, 18b are used to construct the reinforcement 18, an intersection of strand 18a with strand 18b may be positioned at the projected center of gravity 100 or longitudinal axis intersection point 102.

In the embodiment shown and described herein, the strand 18a may further be applied to the rotor body 12 along a path extending in a generally circumferential direction at least partly around the upper end 12a of the rotor body 12 to thereby define a lip 118 (FIG. 2) proximate the upper end 12a of rotor body 12. To this end, and as shown in FIGS. 4B through 4D, a fixture 124 may be placed at the upper end 12a of the rotor body 12 such that the strand 18a is wrapped around the generally cylindrical fixture 124 in order to form the lip 118 (FIG. 2) located above the upper end 12a of rotor body 12.

FIGS. 5A through 5E illustrate the progression of winding the strand 18a to form layers of reinforcement material. Specifically, the strand 18a is wound repeatedly around the rotor body 12 along the reinforcement path 82 (FIG. 4A). This repeated winding of the strand 18a around the exterior surface 20 of the rotor body 12 yields a plurality of layers of material covering the rotor body 12 that thereby define the reinforcement 18. In a specific embodiment, the strand 18a may be, for example, a carbon fiber strand or filament, as discussed above. The strand or filament may be a composite material of carbon fiber and resin that, at the conclusion of the winding process, is cured in order to form an integral centrifuge rotor 10. Alternatively, various other high-tensile, high-modulus materials, such as glass fiber, synthetic fiber such as para-aramid fiber (e.g., Kevlar®), thermoplastic filament such as ultra high molecular weight polyethylene, metal wire, or other materials suitable for reinforcing the rotor body 12 may be used instead of carbon fiber. Any such materials may be used as a single continuous filament or as multiple filaments, and many such materials can be applied with a resin coating which can be set in a manner analogous to the setting of resin-coated carbon fiber.

As will be appreciated by the description above, the reinforcement may comprise a single fiber tow, multiple fiber tows or unidirectional tape in various alternative embodiments.

While various aspects in accordance with the principles of the invention have been illustrated by the description of various embodiments, and while the embodiments have been described in considerable detail, they are not intended to restrict or in any way limit the scope of the invention to such detail. The various features shown and described herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:
1. A fixed angle centrifuge rotor, comprising:
  a rotor body having a circumferential sidewall and a plurality of tubular cavities, each cavity having an open end and a closed end and being configured to receive a sample container therein; and
  a pressure plate operatively coupled to the plurality of tubular cavities so that the pressure plate, in combination with the plurality of tubular cavities, defines an enclosed hollow chamber between each adjacent pair of the plurality of tubular cavities, wherein the pressure plate has a plurality of circumferentially spaced depressions, each configured to operatively couple with a respective one of the plurality of tubular cavities.

2. The rotor of claim 1, wherein each of the plurality of tubular cavities has a sidewall facing an interior of the rotor body and a bottom wall at the closed end.

3. The rotor of claim 2, wherein said pressure plate comprises a generally conical upstanding wall portion and a bottom wall portion extending outwardly from the generally conical upstanding wall portion.

4. The rotor of claim 3, wherein the generally conical upstanding wall portion of the pressure plate is operatively coupled to each of the sidewalls of the plurality of tubular cavities and the bottom wall portion of the pressure plate is operatively coupled to a substantial portion of each of the bottom walls of the plurality of tubular cavities.

5. The rotor of claim 1, further comprising:
an elongated reinforcement extending around the circumferential sidewall of the rotor body.

6. The rotor of claim 5, wherein the elongated reinforcement extends at least partially around an exterior surface of the pressure plate.

7. The rotor of claim 6, wherein the elongated reinforcement comprises at least a single carbon fiber tow.

8. The rotor of claim 1, wherein at least one of said rotor body or said pressure plate is made of carbon fiber.

9. The rotor of claim 8, wherein said rotor body and said pressure plate are a compression-molded unitary structure.

10. A method for forming a centrifuge rotor having a rotor body including a circumferential sidewall and a plurality of tubular cavities, each cavity having an open end and a closed end and being configured to receive a sample container therein, the method comprising:
operatively coupling a pressure plate having a plurality of circumferentially spaced depressions to the closed end of each of the cavities to thereby define an enclosed hollow chamber between each adjacent pair of tubular cavities, wherein each of the plurality of circumferentially spaced depressions of the pressure plate operatively couples with a respective one of the tubular cavities.

11. The method of claim 10, further comprising:
compression-molding the pressure plate and the rotor body to define a unitary structure.

12. The method of claim 10, further comprising:
applying a reinforcement around an exterior of the rotor body and at least partially around an exterior surface of the pressure plate.

13. The method of claim 12, wherein applying the reinforcement includes winding one of a single carbon fiber tow, multiple carbon fiber tows or unidirectional tape around the exterior of the rotor body.

14. The method of claim 13, wherein the reinforcement is coated with resin, the method further comprising:
curing the reinforcement to make it integral with the rotor body.

15. The method of claim 12, wherein applying the reinforcement includes helically winding one of a single carbon fiber tow, multiple carbon fiber tows or unidirectional tape around the exterior of the rotor body.

16. The method of claim 10, further comprising:
obtaining a top plate having a plurality of holes;
inserting the plurality of tubular cavities through the holes; and
compression-molding the top plate and tubular cavities to define a unitary structure.

17. The method of claim 10, wherein each cavity has a sidewall facing an interior of the rotor body, the method further comprising:
surrounding a substantial portion of the sidewalls of each of the cavities with the enclosed hollow chambers.

18. The method of claim 10, wherein:
each cavity has a bottom wall at the closed end, and
operatively coupling the pressure plate to the closed end of each of the cavities includes engaging a substantial portion of each of the bottom walls of the cavities with the pressure plate.

* * * * *